United States Patent Office 3,141,020
Patented July 14, 1964

3,141,020
BASIC AMIDES OF 1-(β-CARBOXYETHYL)-2,3-POLYMETHYLENEINDOLES
Meier E. Freed, Philadelphia, Pa., and Leonard M. Rice, Baltimore, Md., assignors to American Home Products Corporation, New York, N.Y., a corporation of Delaware
No Drawing. Filed Apr. 16, 1962, Ser. No. 187,939
4 Claims. (Cl. 260—268)

This invention relates to novel amides of the indole series and salts thereof. The new base compounds of this invention have the formula

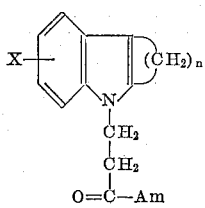

where n is 5 or 6, X may be hydrogen, lower alkyl, halogen, nitro, amino, or lower alkoxy and Am is a basic amido radical derived from a diamine having from four to about twelve carbon atoms, having its two nitrogen atoms separated by a chain of from two to three carbon atoms and selected from the group consisting of aminoalkyl tertiary amines, (lower alkyl)-aminoalkyl tertiary amines, and iminodialkyl tertiary amines. Thus, the radical designated above as Am may be 4-methylpiperazino, 4-ethylpiperazino, 4-phenylpiperazino, β-dimethylaminoethylamino, β-pyrrolidinoethylamino, γ-dimethylaminopropylamino, β-diethylaminoethylamino, β-dibutylaminoethylamino, methyl - γ - dibutylaminopropylamino, or the like.

The compounds of this invention are useful because of their valuable pharmacological properties. Specifically, the compounds are effective as anticonvulsants and serve to lower blood pressure.

The compounds of this invention, ordinarily in the form of their salts with pharmaceutically acceptable acids, may be combined with fillers, diluents, solvents, or other carriers and administered orally or parenterally. Suitable acids with which to form salts of the bases of this invention include hydrochloric, sulfuric, maleic, malic, fumaric, citric and succinic acids.

As starting materials for the synthesis of the compounds of this invention, we employ 2,3-polymethyleneindoles having the formula

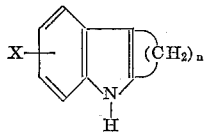

where X and n have the meanings already given. These are reacted with acrylonitrile to form the corresponding 1-(β-cyanoethyl)-2,3-polymethyleneindoles which are then subjected to hydrolysis or hydrolysis-esterification to yield the corresponding 1-(β-carboxyethyl)-2,3-polymethyleneindole or 1-(β-carboalkoxyethyl)-2,3-polymethyleneindole. A 1-(β-carboxyethyl)-2,3-polymethyleneindole may be converted to the acid chloride and then reacted with a suitable diamine to form a base product of this invention; a 1-(β-carboalkoxyethyl)-2,3-polymethyleneindole may be treated directly with a suitable diamine to form a base of this invention.

The sequence of reactions employed for this synthesis is illustrated by the following abbreviated equations showing the preparation of the product of Example 1.

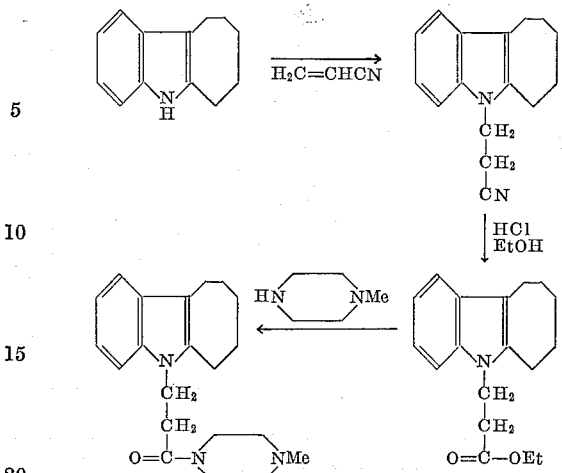

The following examples illustrate the preparation of our new compounds:

Example 1

(a) Aclylonitrile, 11 grams (0.2 mole), is added slowly with cooling to a solution of 2,3-pentamethyleneindole, 37 grams (0.2 mole), and 4 ml. of trimethylbenzylammonium methoxide (40% in methanol) in 100 ml. of benzene. The reaction temperature reaches 50° and then drops slowly. After stirring for an additional hour, 5 ml. of concentrated hydrochloric acid is added. The benzene solution is washed well with water, and then dried over sodium sulfate. The solution is concentrated and the residue crystallized from acetone-methanol. Yield of 1-(β-cyanoethyl)-2,3-pentamethyleneindole: 27 grams (56.6%), M.P. 95–96°.

Analysis:

|  | C | H | N |
|---|---|---|---|
| Calculated for $C_{16}H_{18}N_2$ | 80.50 | 7.60 | 11.78 |
| Found | 80.41 | 7.64 | 11.76 |

(b) Forty grams (0.17 mole) of 1-(β-cyanoethyl)-2,3-pentamethyleneindole, prepared as described in Example 1(a), is dissolved in 300 ml. of absolute ethanol. The resulting solution is saturated with dry hydrogen chloride, 2 ml. of water is added, and the mixture boiled under reflux for two hours and then cooled to room temperature. Ammonium chloride which separates is filtered off and the filtrate concentrated in vacuo. The residue is taken up in ether, water-washed, and dried. The solvent is then evaporated and the product distilled. The yield is 31 grams of 1-(β-carboethoxyethyl)-2,3-pentamethyleneindole boiling between 220 and 225° C. at 0.05 mm. Hg.

Analysis:

|  | C | H | N |
|---|---|---|---|
| Calculated for $C_{18}H_{23}NO_2$ | 75.75 | 8.12 | 4.91 |
| Found | 75.56 | 8.26 | 4.79 |

(c) A mixture of 5.2 g. (0.02 mole) of 1-(β-carboethoxyethyl)-2,3-pentamethyleneindole and 3 g. (0.03 mole) of 1-methylpiperazine is dissolved in 15 ml. of ethylene glycol and heated to 140–150° for two hours. The mixture is then heated at 100° and 20 mm. pressure to remove any volatile components. After cooling the mixture is poured into 100 ml. ice-water. The oil layer is taken up in ether, washed with water several times, and dried over sodium sulphate. This solution is added to a solution of maleic acid in ether. The precipitate is crystallized from methanol-acetone, and then from 2-propanol, M.P. 169–170°. The product is the maleate of 1-methyl-4-(3-[2,3-pentamethyleneindol-1-yl]-propionyl)piperazine.

Analysis:

|  | C | H | N |
|---|---|---|---|
| Calculated for $C_{25}H_{33}N_3O_5$ | 65.55 | 7.30 | 9.22 |
| Found | 65.74 | 7.32 | 9.16 |

Example 2

(a) 1-(β-cyanoethyl)-2,3-hexamethyleneindole is prepared according to Example 1(a) from 2,3-hexamethyleneindole (99.7 g.), acrylonitrile (29.2 g.), and trimethylbenzylammonium methoxide (2 ml. of 40% methanolic solution) in benzene (300 ml.).

Analysis:

|  | C | H | N |
|---|---|---|---|
| Calculated for $C_{17}H_{20}N_2$ | 80.91 | 7.99 | 11.10 |
| Found | 81.02 | 7.80 | 11.13 |

(b) 1-(β-carbomethoxyethyl)-2,3-hexamethyleneindole is prepared from 75.8 g. of 1-(β-cyanoethyl)-2,3-hexamethyleneindole (prepared as described in part (a) hereof, by the following general procedure given in Example 1(b), using 1250 ml. of methanol and 5 ml. of water.

Analysis:

|  | C | H | N |
|---|---|---|---|
| Calculated for $C_{18}H_{23}O_2N$ | 75.75 | 8.12 | 4.91 |
| Found | 75.49 | 8.10 | 4.94 |

(c) A mixture of 5 g. (0.02 mole) 1-carbomethoxyethyl-2,3-hexamethyleneindole and 10 ml. dimethylaminoethylamine is heated under reflux for eight hours. Excess of dimethylaminoethylamine is then removed by distillation. The residue is cooled and poured into water, acidified with dilute hydrochloric acid and the mixture extracted with ether. This extract is discarded and the aqueous solution made basic. The product separates as an oil and is extracted into benzene. The benzene extract is washed with saline and then dried over sodium sulfate. The solvent is removed under vacuum and the residue dissolved in 2-propanol. The solution is added to a solution of maleic acid (2.2 g.). The maleate of N-dimethylaminoethyl-3-[2,3-hexamethyleneindol-1-yl]propionamide precipitates and is recrystallized from 2-propanol, M.P. 133–134°.

Analysis:

|  | C | H | N |
|---|---|---|---|
| Calculated for $C_{25}H_{35}N_3O_5$ | 65.28 | 7.71 | 9.19 |
| Found | 65.54 | 7.63 | 8.96 |

Example 3

To a solution of 7.5 g. (0.03 mole) 1-(β-carboxyethyl)-2,3-pentamethyleneindole (prepared by hydrolysis of the product of either Example 1(a) or 1(b)) in 300 ml. of dry benzene, in a one l. flask, fitted with sealed stirrer, reflux condenser and dropping funnel, is added 2.2 ml. of silicon tetrachloride. This is stirred for 48 hours at 50° and finally boiled for 2 hours. After cooling, a solution of aminoethylpyrrolidine, 16.5 g. (0.15 mole), in benzene is added, with stirring. The reaction mixture is then heated under reflux for 12 hours, benzene is distilled off, and the residue is treated with 5% sodium hydroxide and extracted with ether. The extract is washed with saline, dried, and then evaporated to a syrup. This is taken into acetone and the hydrochloride salt of N-pyrrolidinoethyl-3-(2,3-pentamethyleneindol-1-yl)propionamide precipitated by treatment of the solution with dry hydrogen chloride. The product was recrystallized from ethanol-ether, M.P. 173–174°.

Analysis:

|  | N | Cl |
|---|---|---|
| Calculated for $C_{22}H_{32}ON_3Cl$ | 10.78 | 9.05 |
| Found | 10.71 | 8.95 |

Example 4

Diethylaminoethyl-3-[2,3-pentamethyleneindol-1-yl]-propionamide is prepared from 1-(β-carbomethoxyethyl)-2,3-pentamethyleneindole and diethylaminoethylamine by the method of Example 2(c).

Example 5

Dimethylaminopropyl-3-[2,3-pentamethyleneindol-1-yl]propionamide is made from 1-(β-carbomethoxyethyl)-2,3-pentamethyleneindole and 3-dimethylaminopropylamine by the method of Example 2(c).

Example 6

1-phenyl-4-(3-[2,3-pentamethyleneindol-1-yl]propionyl)piperazine is made from 1-(β-carbomethoxyethyl)-2,3-pentamethyleneindole and 1-phenylpiperazine, following the procedure of Example 1(c).

We claim:

1. A compound selected from the group consisting of bases having the formua

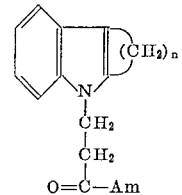

where n is a number selected from the group consisting of 5 and 6, and Am is a radical of the group consisting of 4-methylpiperazino, 4-phenylpiperazino, β-dimethylaminoethylamino, β-pyrrolidinoethylamino, β-diethylaminoethylamino, and γ-dimethylaminopropylamino, and the salts of said bases with pharmaceutically acceptable acids.

2. 1-methyl-4-(3-[2,3-pentamethyleneindole-1-yl]propionyl)piperazine.

3. N-dimethylaminoethyl-3-[2,3-hexamethyleneindole-1-yl]propionamide.

4. N-pyrrolidinoethyl-3-[2,3-pentamethyleneindole-1-yl]propionamide.

References Cited in the file of this patent

UNITED STATES PATENTS

| 2,541,211 | Cusic et al. | Feb. 13, 1951 |
| 2,719,850 | Cusic | Oct. 4, 1955 |